United States Patent [19]

Fumihiko et al.

[11] 4,142,246

[45] Feb. 27, 1979

[54] SEQUENCE CONTROLLER WITH DYNAMICALLY CHANGEABLE PROGRAM

[75] Inventors: Takezoe Fumihiko; Shigeru Omori, both of Kanagawa, Japan

[73] Assignee: Fuji Electric Company, Ltd., Tokyo, Japan

[21] Appl. No.: 859,827

[22] Filed: Dec. 12, 1977

[30] Foreign Application Priority Data

Dec. 23, 1976 [JP] Japan .................................. 51/15556

[51] Int. Cl.² .............................................. G06F 9/06
[52] U.S. Cl. .................................................. 364/900
[58] Field of Search ................ 364/200 MS File, 706, 364/900 MS File

[56] References Cited

U.S. PATENT DOCUMENTS

| | | | |
|---|---|---|---|
| 3,289,168 | 11/1966 | Walton et al. | 364/200 |
| 3,334,334 | 8/1967 | Halpin | 364/200 |
| 3,611,311 | 10/1971 | Andrews | 364/200 |
| 3,760,369 | 9/1973 | Kemp | 364/200 |
| 3,911,406 | 10/1975 | McLaughlin et al. | 364/200 |
| 3,991,408 | 11/1976 | Holmes, Jr. et al. | 364/900 |

*Primary Examiner*—Harvey E. Springborn
*Attorney, Agent, or Firm*—Bruce L. Birchard

[57] ABSTRACT

By storing, along with each signal or bit controlling a step to be taken in a process sequence, an additional signal or bit to be applied to the gating terminal or pin of respective ones of a plurality of "and" gates, to the other input terminal of each of which is supplied its respective input signal from a process control element, such as a sensor, switch or valve (each such input signal indicating a changed condition in the process which requires a changed process control sequence) any sequence may be interrupted following any step in that sequence and a new sequence may be called up to make the needed correction or change in the process.

8 Claims, 4 Drawing Figures

SEQUENCE CONTROLLER WITH DYNAMICALLY CHANGEABLE PROGRAM

BACKGROUND OF THE INVENTION

1. Field of the Invention

This invention relates to sequence controllers and, more particularly to multi-program sequence controllers with preferential priority program designation capability.

2. Description of the Prior Art

Sequential control circuits, particularly for industry, have, in the past, relied primarily on electro-mechanical relay logic. More recently semiconductor sequences, or hybrid sequencers have appeared on the industrial scene. All of these sequencers suffer from a primary limitation. That is, that once the sequence has begun it cannot be interdicted. This rigidity can and has caused damage to the process or apparatus being controlled. In many practical cases it is desirable to be able to change preferences or priorities during processing. Special problems arise with conventional circuits when a second signal, of the same priority as the first, is introduced for the purpose of pre-empting the sequencing program of the first signal. Similarly, problems arise in the case where the order of priority for two input signals cannot be established until a third signal appears and that signal may occur in the middle of an on-going sequence.

The mere introduction of a PROM to store multiple sequencing programs does not solve the problem of fixed priority during sequencing.

Therefore, it is one object of this invention to overcome all of the shortcomings of the present systems, as described hereinbefore.

It is a further object of this invention to provide a sequence controller with a dynamically changeable program.

It is a still further object of this invention to provide a multiple-sequence controller in which an on-going sequence may be interdicted and replaced by a preferred sequence.

SUMMARY OF THE INVENTION

A plurality of sequencing programs is stored in respective stages of a ROM or PROM. In each stage, in addition to the sequencing program, there is stored a series of binary bits which are fed out to respective input signal gates after each step in the sequence has been executed. At least one of the bits applied to a gate other than that corresponding to the input signal which has triggered the currently active sequence, is a "one", which makes the gate to which it is applied amenable to shifting the sequencing activity to a different stage in the ROM and a different sequence if an input signal has been applied to that same gate. Thus, the on-going sequence may be interrupted and a preferred sequence, at a different stage in the ROM or PROM may be substituted. This changing may occur after each step in any stage of the stored sequences. A high degree of dynamic, preferential processing may thus be achieved.

BRIEF DESCRIPTION OF THE DRAWINGS

A better understanding of the present invention may be had from a consideration of the following detailed description, taken in conjunction with the accompanying drawings, in which.

DETAILED DESCRIPTION OF THE PREFERRED EMBODIMENT

Figure 1:
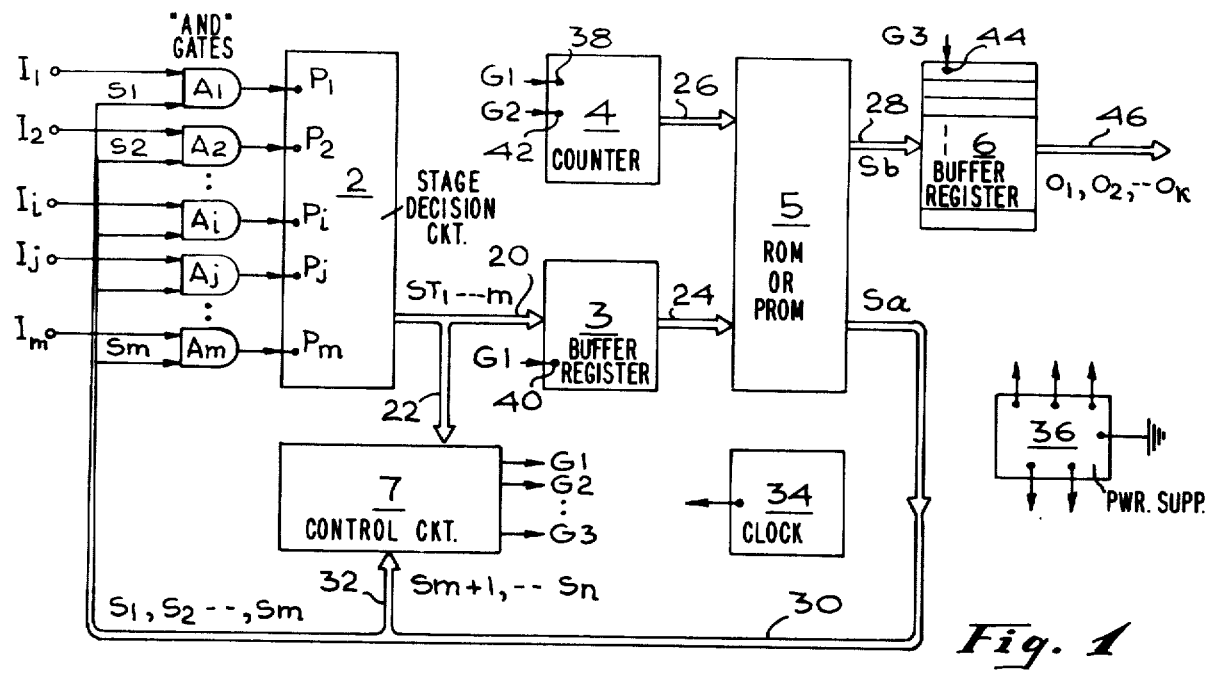
FIG. 1 is a block diagram of a sequence controller with dynamically changeable program according to the present invention.

In FIG. 1, input signal terminals $I_1$ through $I_m$ are provided for the application thereto of input signals having corresponding designations. Such input signals are derived from sensors, switches and valves, for example, in a process control system and indicate a changed condition which requires a changed process control sequence. For example, the level of a liquid in a process may have exceeded a desired maximum, causing a float to activate a limit switch. That limit switch closure would constitute an input signal to one of the input signal terminals $I_1$ through $I_m$ and would indicate that the next step in the process should not be that indicated by the then-controlling sequence, for example bringing the liquid to a boiling state, but, instead should be a pumping out of or a draining off of the excess liquid. Input terminals $I_1$ through $I_m$ are connected to one input terminal each of "AND" gates $A_1$ through $A_m$, respectively. The output of each of the "AND" gates is coupled to a respective input terminal $P_1$ through $P_m$ of stage decision circuit 2. Stage decision circuit 2 may be an encoder such as that manufactured by Texas Instruments, Incorporated and designated Type SN54147 or Type SN54LS147. Detailed information including pin connections and function tables for these MSI chips may be found at pp. 7-151 and 7-152 of Bulletin No. DL-S 7611727 dated October, 1976, and issued by Texas Instruments Incorporated, P. O. Box 5012, Dallas, Tex. 75222.

Such a stage decision circuit performs the function of partially determining which input signal should control the sequencing operation. Output stage signals $ST_1$ through $ST_m$ appear on individual conductors in busses 20 and 22 and are applied to the respective input terminals of control circuit 7 and stage register 3. Stage register 3 may be a semiconductor type SN74194. Device SN74194 is a 4-bit bi-directional universal shift register described in detail as to its functions and pin connections at page 438 of the TTL DATA BOOK published in 1976 by Texas Instrument Incorporated, P. O. Box 5012, Dallas, Tex. 75222. Actually, two such SN74194's may be required to achieve the desired register capacity for this sequencer. The output signal from register 3 appearing in multi-conductor buss 24 is applied to ROM or PROM 5 and designates a stage-address in memory 5 where desired sequencing data is stored. Counter 4 which may be, for example, a semi-conductor type SN74161 (a synchronous 4-bit counter which is described in detail, both as to its pin connections and operating characteristics at pp. 325, 326 of the TTL DATA BOOK, supra), is coupled through buss 26 to the input terminals of memory 5 for the purpose of designating which step in any stage of memory 5 is to provide the sequence control signals $S_b$ and the gating signals $S_a$, at any moment.

Various memory devices may be used for read-only memory 5 but, for maximum flexibility a programmable read-only memory such as semiconductor type INTEL 2708 is preferable. The PROM designated INTEL2708 is described in detail both as to its pin connections and operating characteristics in numerical sequence in the INTEL COMPONENT DATA CATALOG for 1976, published by INTEL CORPORATION, 3065 Bowers Avenue, Santa Clara, Ca. 905051. Two I2708's may be required to achieve the desired memory capacity for PROM 5.

The sequencing signals $S_b$ are fed through multiple conductor buss 28 to buffer register 6, which may be a type SN74194 4-bit bi-directional universal shift register available from Texas Instruments Incorporated and referred to supra. The purpose of buffer register 6 is to isolate the PROM 5 from the controlled devices so that noise or other transient phenomena, which may occur in PROM 5 during stage-shifting, will not cause erroneous sequencing of the equipment being controlled.

Buss 30, which contains "n" conductors, carries gating and control signals $S_1$ through $S_m$ and $S_{m+1}$ through $S_n$, respectively. The individual conductors are dedicated to carrying the correspondingly designated gating or control signals. The gating signals $S_1$ through $S_m$ are applied to the remaining input terminal of each of the respective and corresponding "AND" gates $A_1$ through $A_m$.

The control signals $S_{m+1}$ through $S_n$ are applied to control circuit 7 through their respective conductors in buss 32. Control circuit 7 may be made up of AND gates type SN7408 and flip-flops type SN74107 the characteristics of both of which can be found in THE TTL DATA BOOK published by TEXAS INSTRUMENTS in 1976, the latter device being found at pp. 107 and 120 of that publication.

A clock pulse generator 34 is provided to synchronize the stage-decision making, counting, addressing, registering and read-out functions. Such clock pulse generator may be integral with the PROM or ROM chip.

A power supply 36, with appropriate output voltages for operating the sequencer is also provided. Power busses, not specifically shown, connect the power supply to appropriate chip terminals.

Figure 2:
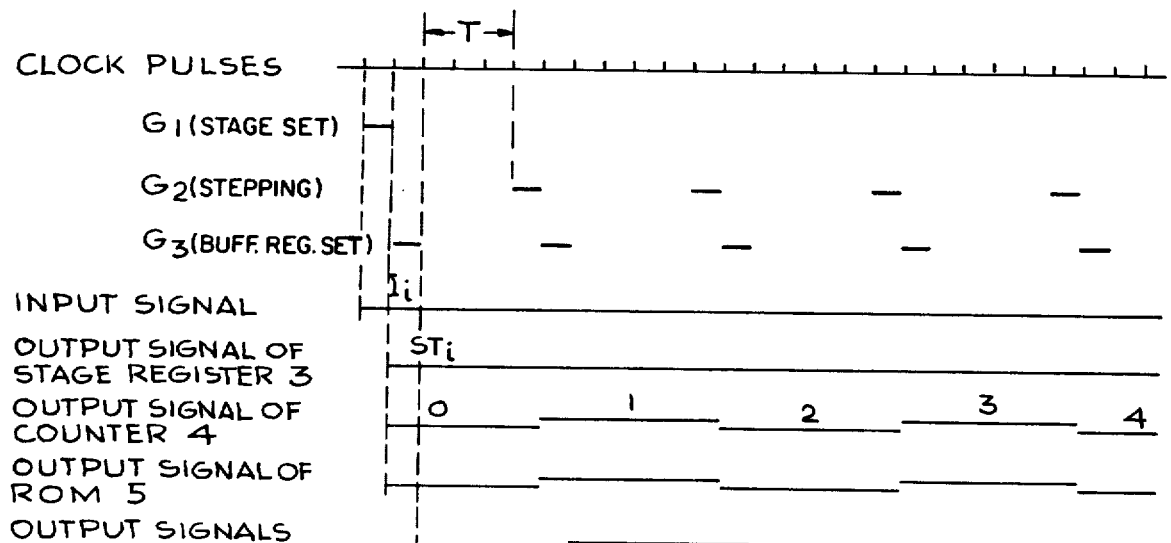
FIG. 2 is a first timing diagram displaying the relationship of certain signals generated in the operation of my invention; and, FIG. 3 is a second timing diagram showing more detailed relationships of certain signals generated in the operation of my invention; and, FIG. 4 is a detailed block diagram of a portion of the block diagram of FIG. 1.
Figure 3:
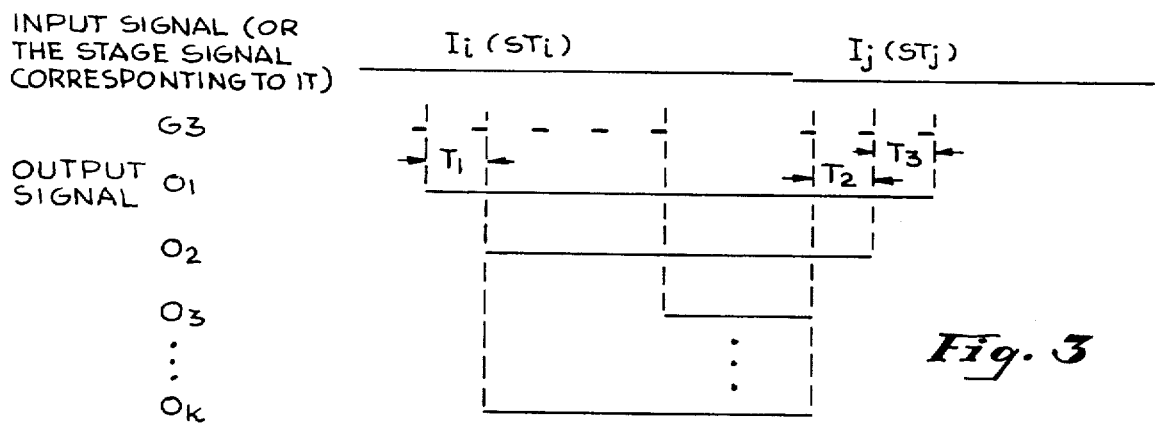

The operation of the sequencer can best be understood by referring to FIGS. 2 and 3, as well as FIG. 1.

When power supply 36 is turned on registers 3 and 6 and counter 4 are in a basic state and the designated address in memory 5 is 0,0. The gating signals $S_1$ through $S_m$ are all "1's" at this address. Therefore AND gates $A_1$ through $A_m$ are all receptive to the passage of any input signal. When an input signal $I_1$ through $I_m$ appears it passes through the respective AND gate with the same subscript designation. As a result, in the stage decision circuit 2, the stage $ST_i$(i = 1 through m) corresponding to that input signal is determined and a related signal is applied through buss 22 to control circuit 7 and through buss 20 to stage register 3. In response to the stage signal $ST_i$, circuit 7 generates a stage set signal $G_i$ (FIG. 2) which is applied to stage register 3 and counter 4. When signal $G_i$ is applied to stage register 3, terminal 40, it sets in that register the stage which is to be addressed in ROM 5. The application, at any time, of signal $G_1$ to counter 4, terminal 38, zeroes that counter.

The stage in ROM 5 having been designated by register 3 and the step in that stage having been designated as "0" by counter 4, the sequencing data at that address is read out to buffer register 6. The next clock pulse sets that signal $S_b$ into register 6. (See FIG. 2).

Whenever counter 4 is reset to zero as a corrolary to a stage designation signal having been set into stage register 3, each of the gating signals $S_1$ through $S_m$ is brought to zero so that each of the AND gates is closed, at least for that step in the sequence. With those signals at zero there is no output signal from stage decision circuit 2. After a period of time "T", which is determined for each step of each stage by the information contained in the control pulses $S_{m+1}$ through $S_n$ fed to control circuit 7 from ROM 5, control circuit 7 generates a stepping signal $G_2$ which is applied to counter 4 through terminal 42 and causes that counter to step up one step and causes the output from ROM 5 to be derived from the next higher step in the stage which was previously designated in ROM 5. Those output signals are $S_a$ and $S_b$ at that address. $S_b$ is transferred to register 6 and causes a predetermined sequence to occur in the controlled apparatus or process. The control bit signals $S_1$ through $S_m$, with at least one of them (other than the one corresponding to the then-controlling input signal) being a "1" so as to permit new instructions to the sequencer, are fed to their respective AND gates.

If no input signal of higher priority than the one then controlling the sequence appears at an AND gate, the control circuit 7 generates a set signal $G_3$ which is applied to terminal 44 of register 6 and sets the data from ROM 5 into register 6, and a stepping signal $G_2$ and the sequence then in progress moves forward one more step.

After completion of a series of sequential control operations, ROM 5 outputs a "completion of information" signal in signals $S_{m+1}$ through $S_n$. The control circuit 7, receiving such completion signal, suspends the generation of the stepping signal $G_2$ and the output register-set signal $G_3$.

As for changing the sequencing to a new format during the earlier-designated sequence, each series of control signals $S_1$ through $S_m$ contains at least one bit that has a value of "1". For example, control signal $S_j$ may have the value "1". Correspondingly, AND gate $A_j$ will be open for an input signal $I_j$ and if such input signal appears it will have priority over the previous incoming signal $I_i$ and will reach stage decision circuit 2 which will output a stage setting signal $ST_j$. That signal will be fed to stage register 3 and to control circuit 7. The latter control circuit will generate a stage setting signal $G_1$ which will zero counter 4 and set register 3 to a new stage $ST_j$. At the next clock pulse, control circuit 7 generates set signal $G_3$ which is applied to output register 6 through terminal 44 and the output sequencing signal $S_b$ will be set in register 6.

When counter 4 is reset to zero by signal $G_1$, each of the control signals $S_1$ through $S_m$ is made a "zero" so that each of the AND gates $A_1$ through $A_m$ is closed, but, in the fashion already described, any new, higher priority input signal may take over the operation at the end of that step in the sequence.

In FIG. 3 the effect of input signal priority in changing output signals from the sequencer is shown.

Initially input signal $I_i$ is received at AND gate $A_i$ and causes stage decision circuit 2 to apply a staging signal $ST_i$ to control circuit 7 and to stage register 3. Control circuit 7 outputs a signal $G_1$ which sets signal $ST_i$ into register 3 and zeroes counter 4. The output of ROM or PROM 5 at this address is read out to buffer register 6 and is set in that register by set signal $G_3$. Output signal $O_1$, being the output signal for the first step in the sequence at stage "i" in ROM 5, begins. There being no other input signal of higher priority, stepping signal $G_2$ is generated by control circuit 7 and the next signals, $O_2$ and $O_k$ in the sequence of stage "i" appear at the output buss 46 from register 6. As shown in FIG. 3, this process continues through signal $O_3$, which is produced after the fifth set signal $G_3$.

After the fifth set signal $G_3$ there is a time in which no additional set signals are generated. In that period input signal $I_j$ is applied to the sequencer and a "one" signal appears on AND gate $A_j$, permitting stage $ST_j$ to be selected in ROM 5. At that point output signals $O_3$ to $O_k$ are terminated. After a time $T_2$ the output $O_2$ is terminated and after a time $T_3$ the output $O_1$ is terminated. Such a pair of sequences may have practical application in process controlling. For example, the $I_i$ signals may cause discharge of certain goods and the $I_j$ signals may terminate the discharge by sequentially closing outlets.

During the time when a first input signal has been superseded by a higher priority signal, the contents of stage register 3, counter 4 and output register 6 may be temporarily stored in an auxiliary register (not shown) and, when the sequence of the superseding signal is completed, those contents may be returned to their original places and the earlier sequence resumed.

Figure 4:
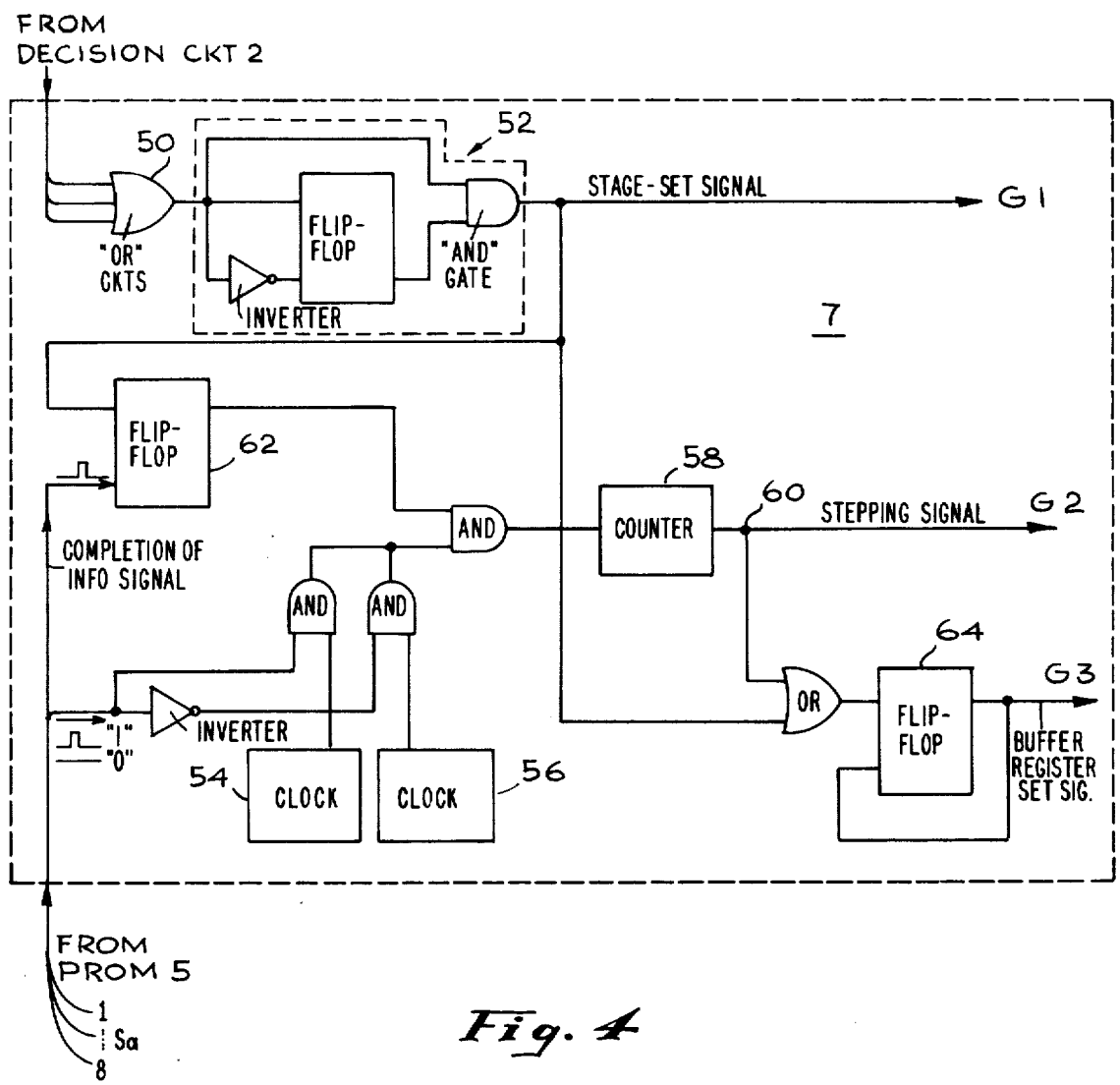

Purely by way of example, control circuit 7 may have the configuration shown in FIG. 4. In that figure, staging signals $St_1$ through $St_m$ are each applied through "or" circuits 50 to a respective detector 52 which is designed to detect changes between "0" and "1" signal states. The main semiconductor device in detector 52 is an SN 74107.

Clock pulse generators 54 and 56 put out clock pulses of differing periodicity from one another. A bit signal included in the $S_a$ signals from PROM 5 (FIG. 1) is sent to monitoring circuitry of clocks 54 and 56. When such bit signal is a "1", the output of clock 54 is sent to counter 58. When the bit signal is a "0" the output of clock 56 is sent to counter 58. Thus the bit signal from PROM 5 can control timing (period T).

Stepping signal $G_2$ appears at the carry output terminal 60 of counter 58 (which may be a type SN74161) when input signals are applied to the count enable terminals of the SN 74161.

The "completion of information" signal referred to in the discussion of FIG. 1 is taken from PROM 5 and applied to flip-flop 62 to cause cessation of the generation of the stepping signal $G_2$ and the output register-set signal $G_3$. Flip-flop 62 may be an SN74107, as may be flip-flop 64.

Although there has been described hereinbefore a particular system for a sequence controller with dynamically changeable program in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. For use in a process control system having processing apparatus to be sequenced, a sequence controller with a dynamically changeable sequencing program, including:

a plurality of process-signal input terminals adapted for connection to selected and respective condition indicators in said process control system;

an equal plurality of AND gates, each having a signal pin, a gating pin and an output pin, each of said process signal input terminals being connected to a respective one of said signal pins of said AND gates, said AND gates each being responsive to the coincidence of a process signal and a "one" gating signal at its signal and gating pins, respectively, to produce a stage-indication signal at its output terminal;

read-only memory means having a plurality of multiple-step storage stages each containing, at each step, output signals comprising sequence control signals and associated binary gating signals, said gating signals being, in number, at least equal to the number of said AND gates, said read-only memory means having stage addressing pins, sequence-control-signal output pins and, in addition, a gating signal output terminal corresponding to each of said binary gating signals, each of said gating signal output terminals of said read-only memory being connected to a respective one of said gating pins of said AND gates;

stage and step addressing and read-out means, including counter means, coupled between said output pins of said AND gates and said stage-addressing pins of said read-only memory and responsive to stage-indication signals from said AND gates for addressing and reading out, selectively, from stages and steps in said read-only memory the sequence control and gating signals contained therein; and, means coupled to said addressing and read-out means for applying said sequence control signals to said processing apparatus.

2. Apparatus according to claim 1 in which said read-only memory is programmable.

3. Apparatus according to claim 1 in which said stage and step addressing and read-out means includes a stage decision circuit coupled between said output pins of said AND gates and said stage-addressing pins of said read-only memory and responsive to stage-indication signals from a plurality of said AND gates for designating the stage-indication signal of highest priority for addressing said read-only memory.

4. Apparatus according to claim 3 in which said stage and step addressing and read-out means includes, in addition, control means coupled to said stage decision circuit and to said gating signal output terminals of said read-only memory and responsive to signals from said stage decision circuit and said gating signal output terminals for producing stage setting, counter stepping and register setting signals at its stage-setting, counter stepping and register-setting output terminals, respectively.

5. Apparatus according to claim 4 which includes, in addition, a buffer register having signal input terminals connected to said sequence-control-signal output pins of said read-only memory and a set pin coupled to said register-setting output terminal of said control means, and responsive to a register-setting signal from said control means to store sequence-control signals from said read-only memory for later controlling of said processing apparatus.

6. In a sequence controller for use in a process control system and having a plurality of signal input terminals adapted to have applied thereto related input signals from respective process condition indicators in said system, each such signal input terminal being coupled to a signal input pin of a respective AND gate, each such AND gate having also a gating pin and a stage indication signal output pin, each such output pin being coupled, selectively, through a priority-encoder to a respective one of the stage-addressing pins of a multiple stage, multiple step read-only memory the sequence-control signal output pins of which are connected to a buffer register; the method for providing a dynamically changeable program for such controller, which includes the steps of:

storing at each step in each utilized stage of said read-only memory binary sequence control signals and an accompanying series of binary gating signals each of said binary gating signals in said series being intended for a respective and specific one of said AND gates, at least one of such binary signals being a "1" if priority is to be given to its related input signal on the appearance of that input signal at its signal input terminal;

reading out said sequence control signals and said accompanying gating signals from successive steps in a first stage of said read-only memory;

applying each of said gating signals to the gating pin of its intended AND gate;

deriving a stage indication signal from the output pin of each intended AND gate upon the coincidence of gating and input signals at said gating and signal input pins, respectively, of each such intended AND gate;

selectively utilizing said stage indication signal from one of said intended AND gates to address a second stage in said read-only memory for reading out therefrom a second set of sequence control signals and its accompanying series of gating signals; and, utilizing said first and second sets of sequence control signals to initiate first and second sequences in said process control system.

7. The method according to claim 6 which includes the additional step of priority-encoding any stage indication signal from each of said AND gates.

8. The method according to claim 6 which includes the additional step of storing said sequence control signals, only, read out from said read-only memory, prior to the step of utilizing any part of either of such first and second sets of sequence control signals.

* * * * *